(No Model.) 4 Sheets—Sheet 1.
G. H. HOLT.
FRUIT STEMMER AND GRADER.
No. 506,042. Patented Oct. 3, 1893.
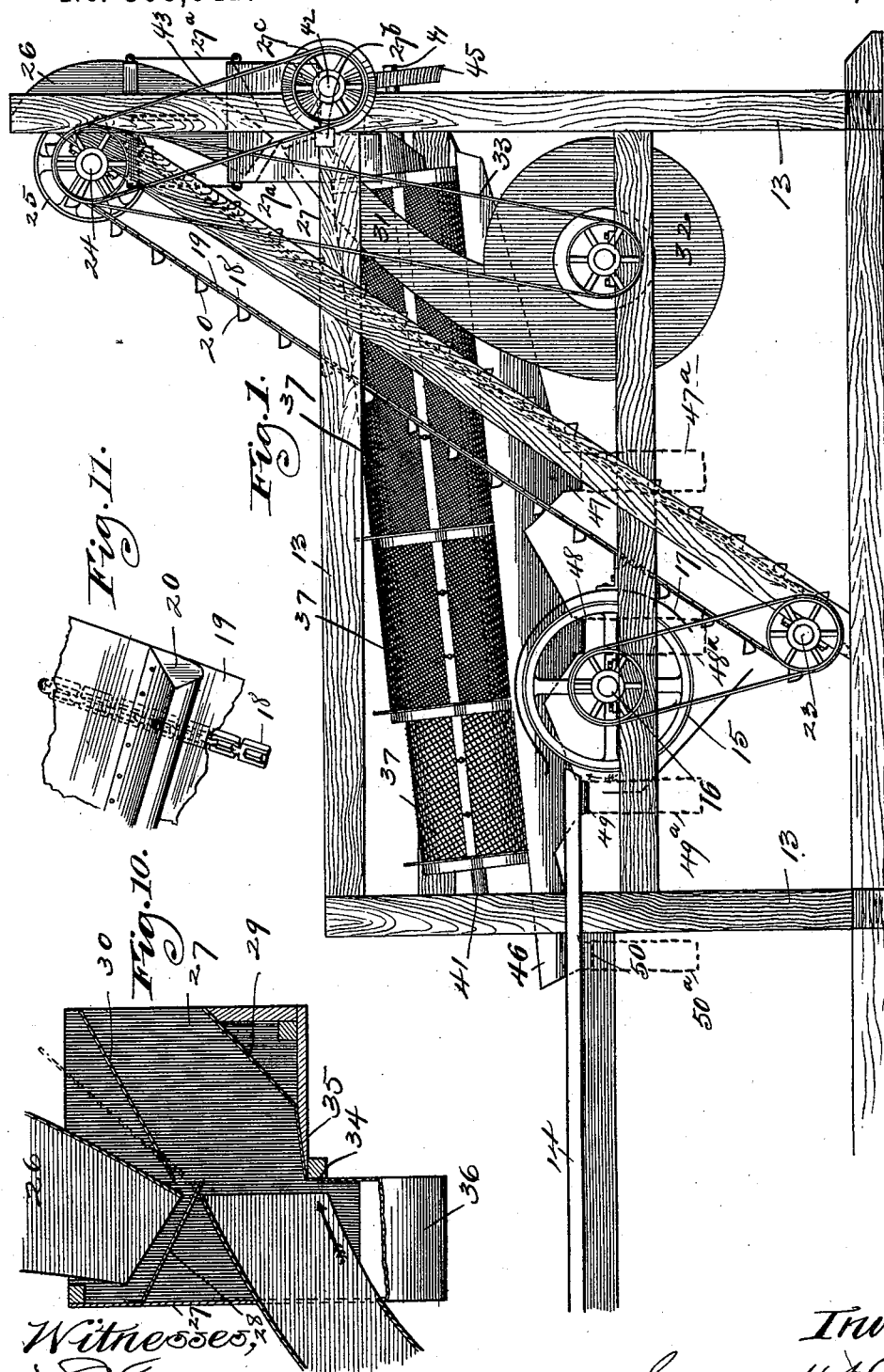
Witnesses:
S. S. Mann
N. M. Bond
Inventor,
George H. Holt
By Offield, Towle & Linthicum
Attys.

(No Model.) 4 Sheets—Sheet 2.
G. H. HOLT.
FRUIT STEMMER AND GRADER.
No. 506,042. Patented Oct. 3, 1893.
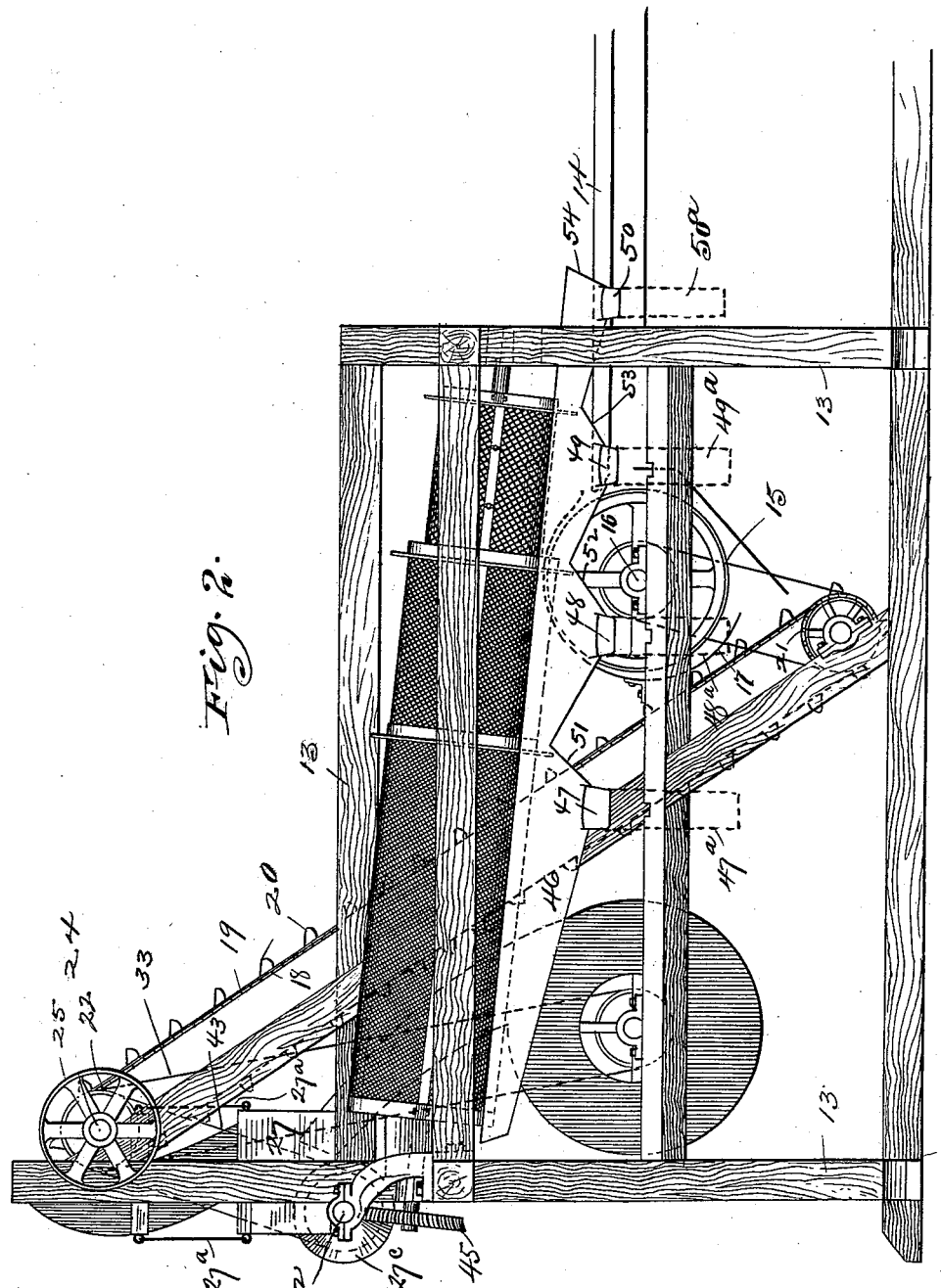
Witnesses,
S. T. Mann,
A. M. Bond.
Inventor,
George H. Holt
By Offield, Towle & Linthicum
Attys.

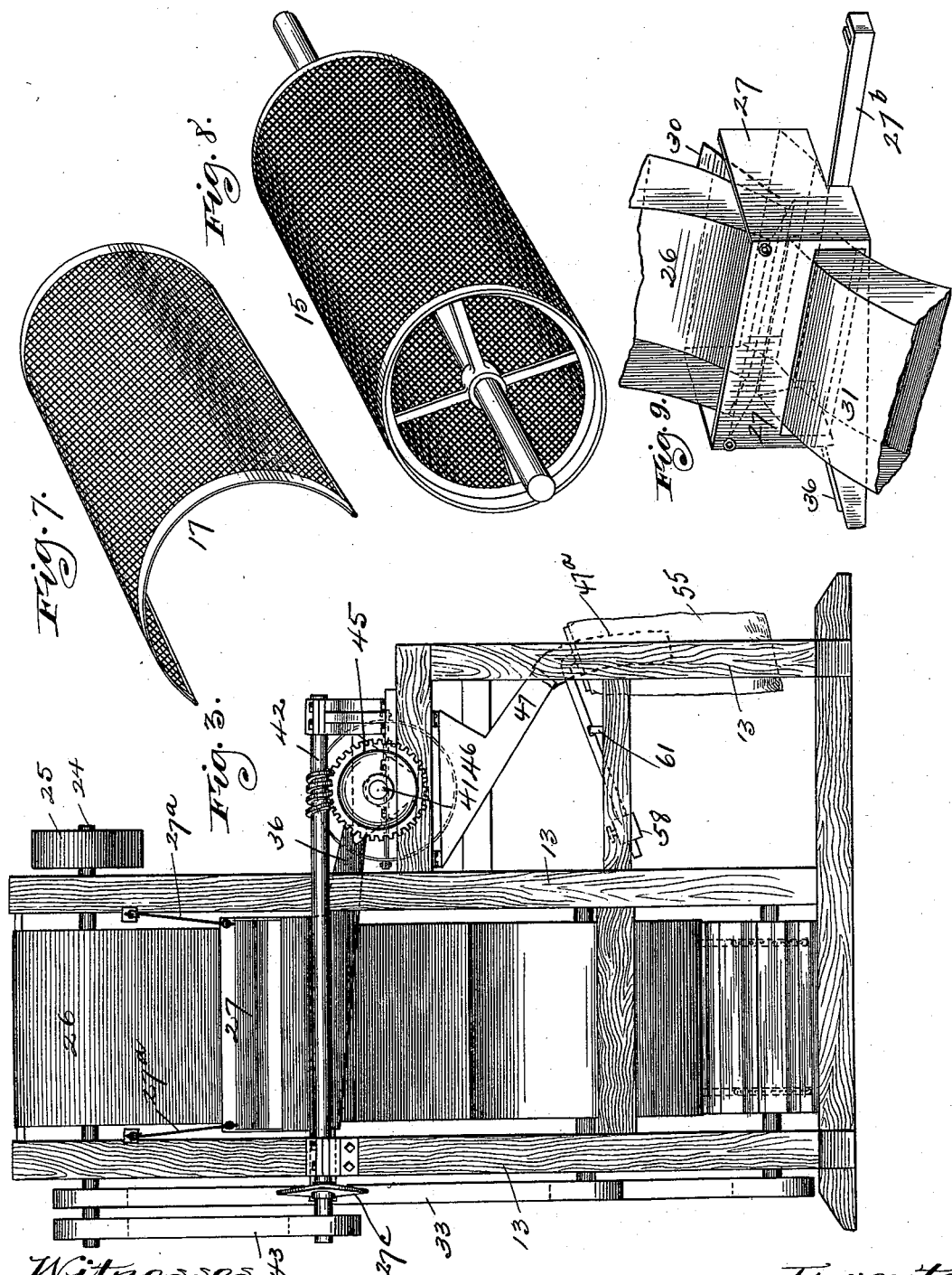

(No Model.) 4 Sheets—Sheet 4.
G. H. HOLT.
FRUIT STEMMER AND GRADER.
No. 506,042. Patented Oct. 3, 1893.
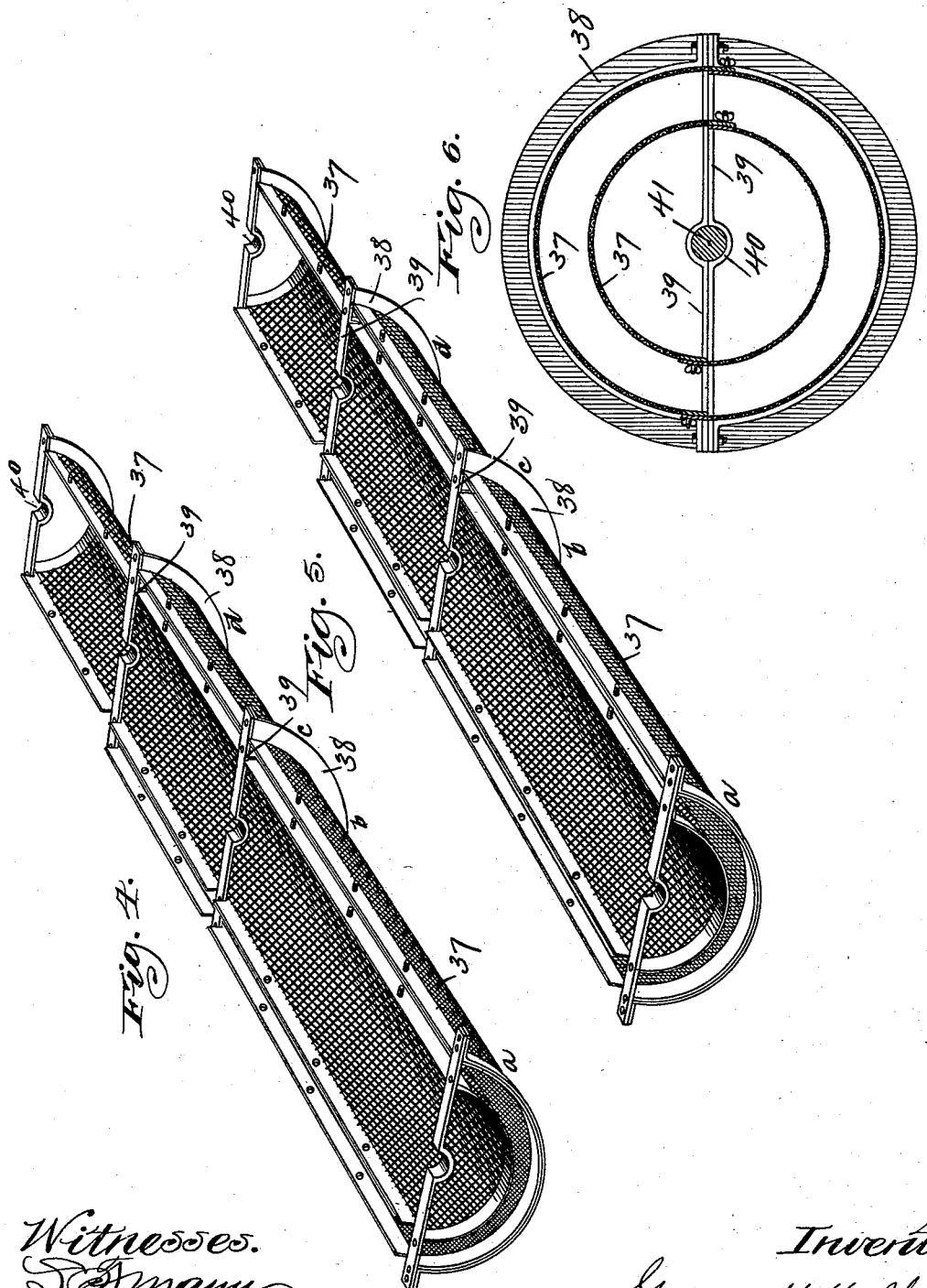
Witnesses.
D. S. Mann
A. M. Bond
Inventor;
George H. Holt
By, Offield, Towle & Linthicum
Attys.

UNITED STATES PATENT OFFICE.

GEORGE H. HOLT, OF CHICAGO, ILLINOIS.

FRUIT STEMMER AND GRADER.

SPECIFICATION forming part of Letters Patent No. 506,042, dated October 3, 1893.

Application filed February 11, 1892. Serial No. 421,167. (No model.)

*To all whom it may concern:*

Be it known that I, GEORGE H. HOLT, a citizen of the United States, residing at Chicago, Illinois, have invented certain new and useful Improvements in a Fruit Stemmer and Grader, of which the following is a specification.

My invention relates to an apparatus for removing the stems from green or dried fruit, such as grapes, raisins, prunes, and the like, and for sorting the fruit into the several grades in which it is usually put upon the market. Apparatus intended to accomplish this work has been constructed heretofore, but numerous defects and imperfections have existed in such apparatus the remedying of which is the object of my invention.

I will describe my invention as applied to the stemming and grading of raisins, but it will be understood that it may be used with slight modifications in the preparation of grapes for canning and in the grading of prunes, and the treating of other fruits.

The apparatus which I have illustrated in the accompanying drawings is intended to take the raisins, separate them from the bunches and remove the short stems which usually remain attached to the raisins, and to separate also the imperfect fruit, leaves, or other foreign matter adhering to or found in the original bunch, while the perfect fruit is carried to and passes through a grader wherein it is graded or sorted into the several grades or sizes usually put upon the market. From this grader the sorted or graded raisins are delivered through separate spouts into bags, boxes or other packages in which the raisins may be shipped or put upon the market without further handling.

The apparatus comprises in the preferred form a stemmer, an elevator, a separator, a grader, and apparatus for packing the fruit. The parts are mounted upon a suitable frame work having a feed table. The stemmer comprises a cylindrical screen, the surface of which is adapted to act in conjunction with a shield eccentrically placed with reference to the screen so as to remove the stems from the fruit. The cylindrical screen and the eccentrically placed shield may be of wire cloth for certain kinds of fruit, or it may be of corrugated metal or be otherwise provided with surfaces which will perform the functions intended. From the stemmer the perfect raisins with the imperfect fruit, stems and other foreign matter are delivered upon an elevator consisting of a driving belt or belts, a flexible web affixed to the driving belt, and buckets secured with the web to the belt. This elevator delivers into a spout which in turn discharges into a separating chamber provided with deflecting partitions so that the material is caused to move in a tortuous path. In this chamber the material is subjected to the action of a blast of air from a fan and the current of air is delivered in such manner and the arrangement of the partitions is such that a current is induced across the path of the incoming material and another current in substantially the same plane as the moving material. By means of this blast, the imperfect fruit, stems, leaves and all other foreign or waste material are carried off and the perfect raisins fall into a spout or chute which delivers them to the grader. This grader is of novel construction and it comprises one or more cylindrical revolving screens. Several of these screens may be arranged concentrically, the inner one having the largest perforations. In this construction the screens are of different lengths, that of the coarsest mesh being longest and retaining only the largest of the raisins which pass out at its open end, while the next larger size pass out through the screen having the next smaller mesh and so on. Instead of using a number of screens and arranging them concentrically a single cylindric perforated screen may be employed, the perforations varying as to size in different portions of the length of the screen, the same ultimate result being attained in either construction. Each grade is delivered to a receiving hopper with a spout from which the raisins are discharged into a packing receptacle, such as a bag or box, and the fruit is thus prepared upon this machine ready for the market.

In the accompanying drawings, Figure 1 is a view of the apparatus in side elevation from that side on which the fan and elevator are located. Fig. 2 is a similar view from the opposite side to that shown in Fig. 1. Fig. 3 is an end elevation. Figs. 4, 5, and 6 are enlarged detail views of the grader. Figs. 7 and 8 are detail views of the stemmer. Figs. 9 and 10 are detail views of the separating chamber. Fig. 11 is a detail view of a section of the elevator.

The apparatus is supported by suitable frame work 13 and the fruit is delivered to the machine from a table 14.

15 is a cylinder the periphery of which may be composed of wire cloth or corrugated sheet metal according to the kind of material operated upon. The purpose of the perforations or corrugations is to furnish surfaces which will engage the stems of the raisins in conjunction with the shield 17, which is in the form of a segment of a cylinder and is placed eccentric to the axis of such cylinder, as clearly shown in Figs. 1 and 2 of the drawings. This shield is so placed that it hangs above the cylinder, the forward margin of the shield being located at a suitable distance from the end of the table. The cylinder is adapted to be revolved by being mounted upon a shaft 16 and will revolve in the direction indicated by the arrow in Fig. 1. The movement of this cylinder carries the bunches of raisins up between its surface and the under surface of the shield and between these surfaces the raisins are separated from the bunch and their stems broken off. The shield is placed eccentric to the cylinder because the bunches of raisins when delivered to the stemmer are in a compact mass, due to a previous treatment not necessary here to be described. As the raisins are severed from the bunch the stems and other waste material are broken by the action of the stemmer and the material increases in bulk, and it is therefore desirable, in order to prevent piercing of the fruit by the broken stems and to prevent its being crushed by the pressure, to enlarge the space between the cylinder and the shield to compensate for this increase in bulk of the material under treatment. This method of placing the shield provides for the necessary increase in space to accommodate this enlargement of bulk. The placing of the shield above the cylinder and the direction of movement of the cylinder result in the delivery of the waste with the fruit upon the elevator, whereby it is carried up together to the separating chamber. The mass of material is delivered from the stemmer upon the elevator which is of novel construction in its details. A broken section of this elevator is shown in Fig. 11 in which 18 represents a link belt, two of which may be employed in a wide elevator and one of which will be sufficient in case of a narrow one.

19 represents a web of canvas or other suitable flexible material which is generally designated the "drapery" of the elevator. This is stretched taut and secured with the buckets 20 to the link belt. The link belts are carried over sprockets 21, 22 mounted on shafts 23, 24, the latter being driven by a belt passed over the pulley 25. The elevator delivers into a curved spout 26, the lower end of which opens within a separating chamber formed by inclosing walls 27. Within these walls are provided fixed partitions, sometimes called "dash boards," 28 and 29 and a hinged board 30. The board 28 deflects the material in its course and serves also to spread it out in a thin sheet. This is better accomplished by imparting to the separating chamber 27 a vibrating or shaking motion, and this may be done by suspending the chamber 27 by means of the rods or straps 27$^a$ and providing it with a pitman 27$^b$ which is reciprocated by means of a cam wheel 27$^c$. Of course the shaking or vibratory motion of this separating chamber may be effected in any other convenient way.

In order to carry off the light or imperfect fruit, stems, leaves, and other foreign or refuse substances, I deliver into this separating chamber a blast of air through the spout 31 from the fan 32 which may be driven by the belt 33 from the shaft 24. By reference to Fig. 10 it will be seen that the inlet spout from the fan is projected into the separating chamber, the bottom wall of the spout being cut away at or about the point of entrance. The blast of air is thus discharged immediately beneath the edge of the deflecting board 28 and at substantially right angles to the stream of material passing over such edge, but in order that the material may be subjected to the action of the air for a longer period and from counter-directions, I so place the inlet spout that a portion of the blast of air is discharged against the wall 34, as indicated by the arrow of Fig. 10. The air upon striking this wall is deflected upwardly and passes through the descending material in opposite direction to the movement of the latter but in about the same plane. The result of this division of the air current is that the material under treatment is subjected to counter-currents of air and all of the light particles and waste are picked up and carried off in the air current which escapes between the partitions 28 and 29 through an opening in the side of the separating chamber. It will be observed that the partition 29 terminates at a point behind the portion of the wall marked 34, leaving an interposed shelf 35 which may be slightly inclined. Upon this shelf the soft, damaged or imperfectly cured raisins, which are often of the consistency of a jelly, are deposited and adhere thereto instead of passing off into the screens which would soon become clogged by them. The partition 30 is hinged at its inner edge so that it may be adjusted to vary the size of the discharge opening whereby the direction and force of the blast may be regulated according to the character of the material under treatment. The raisins freed from the refuse are delivered from the separating chamber into a chute 36 which discharges into the grader. This grader consists of a cylinder or cylinders concentrically arranged and having a perforated wall. In the construction shown in the drawings, two of these cylinders are employed, each being divided longitudinally and the perforated material which is marked 37 being affixed to the longitudinal strips 37ª.

38 represents semi-circular ribs, the ends of these ribs being connected by the cross bars 39 which have bearings 40 for the cylinder-driving shaft 41. Instead of employing this driving shaft the ends of the cylinders may be provided with collars or open driving heads, but in all cases I prefer to divide the cylinders longitudinally so that the parts may be separated for cleaning, and also to adapt the apparatus for use with cylinders of different diameters or of different mesh. As shown the inner cylinder has the coarser mesh and is longer than the outer, while the outer cylinder has its surface provided with perforations of different sizes, the section from $a$ to $b$ being fine and the section from $c$ to $d$ (Fig. 4) coarser but not so coarse as the inner cylinder. These cylinders are revolved by means of the worm shaft 42 driven by the belt 43 from the shaft 24, the worm shaft meshing with the worm wheel 45 secured upon the cylinder shaft 41. The movement of the cylinder is therefore slow in comparison to the movement of the elevator and I prefer to make the grading cylinders for use in grading raisins—say—ten feet long for the longer screen and from fifteen to forty inches in diameter. The raisins are fed into the inner screen and the latter being in motion the smaller grade of raisins pass out through the coarse perforations of the inner screen, as the apparatus is illustrated in the drawings, and fall into the outer cylinder and the smallest grade will pass through the mesh of the section $a$—$b$. The next larger grade, such as loose muscatels, will not pass through the perforations of section $a$—$b$ but will escape through the perforations of the section from $c$ to $d$; while the larger, such as the two crown grade, pass out through the open end of the outer cylinder, and the largest grade, the three crown, not being able to escape through the mesh of the inner cylinder pass out through the open end thereof.

I have shown a trough like receptacle 46 having a series of spouts 47, 48, 49, and 50 which discharge the several grades as they are received from the screens, the inclined partitions 51, 52, 53, and 54 serving to direct the several grades to their appropriate outlets. The ribs 38 serve to prevent the intermingling of the several grades, and for this purpose they are arranged to co-act with the inclined partitions in the trough below, as clearly shown in the drawings.

Owing to the sticky nature of the raisins, their delivery from the sorting apparatus has always been attended with great difficulty. All attempts to control the flow by means of valves, gates or slides have resulted in the massing or packing of the fruit in the mouth of the spout and thus obstructing the passage. Besides this, the raisins have a tendency, as before stated, to form into compact masses and when they are delivered from the open end of the spout in mass, they will tend thus to pack and prevent the even distribution within the packing receptacle. To obviate these difficulties, I attach to the ends of the several spouts flexible sections 47ª, 48ª, 49ª, and 50ª. The bags in which the raisins are packed for shipment are marked 55 and the flexible sections of the spouts depend within these bags, while the latter are filling, as clearly shown in Fig. 3 of the drawings.

I claim—

1. A fruit stemmer comprising in combination a revoluble cylinder and a segmental shield overhanging the cylinder, and eccentric thereto whereby to provide a passage gradually enlarging toward its delivery end, substantially as described.

2. In a fruit cleaner, the combination with a separating chamber, of a spout for delivering the fruit and waste thereto, a deflecting and spreading board arranged beneath the discharge end of said spout, a fan having a spout for delivering a blast of air to the separating chamber, said spout being projected into the chamber beneath the deflecting board and terminating short of the delivery edge thereof, and a vertical wall arranged opposite the bottom portion of the fan spout and in the vertical plane of the delivery edge of the deflecting board whereby a portion of the blast is delivered transversely through the stream of falling material and another portion thereof is deflected to pass vertically through the material, substantially as described.

3. In a fruit cleaner, a separating chamber having an inclined deflecting board over which the fruit is passed, a fan for delivering a blast of air through the stream of fruit, an outlet for the fan blast and an inclined shelf arranged opposite the discharge from the fan and beneath the delivery edge of the deflecting board on which the fruit falls and whereon the bruised and sticky fruit adheres, substantially as described.

4. In a fruit cleaner the combination with a vibrating box forming a separating chamber and provided with inlet and outlet openings for a blast of air, a deflecting board arranged to discharge the fruit into the chamber, a shelf whereon the fruit is delivered and to which the broken and sticky portions adhere and a chute for discharging the sound fruit, substantially as described.

5. In a fruit grader, a cylindric revoluble screen composed of longitudinally divided sections and each section thereof comprising semi-circular ribs having flanged ends connected by cross bars, said cross bars having bearings therein for the driving shaft, substantially as described.

6. In a fruit grader, the combination with the grading devices of delivery spouts to receive the graded fruit and discharge it into suitable packages, said spouts provided with flexible extensions, substantially as described.

GEORGE H. HOLT.

Witnesses:
C. C. LINTHICUM,
N. M. BOND.